(12) United States Patent
Jung et al.

(10) Patent No.: US 10,007,530 B2
(45) Date of Patent: Jun. 26, 2018

(54) ELECTRONIC DEVICE HAVING AN EXTERNAL MEMORY AND METHOD FOR OPERATING THE SAME

(71) Applicant: Samsung Electronics Co., Ltd., Gyeonggi-do (KR)

(72) Inventors: Wonsuk Jung, Gyeonggi-do (KR); Wookwang Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 70 days.

(21) Appl. No.: 15/189,336

(22) Filed: Jun. 22, 2016

(65) Prior Publication Data

US 2016/0378511 A1 Dec. 29, 2016

(30) Foreign Application Priority Data

Jun. 26, 2015 (KR) ........................ 10-2015-0091562

(51) Int. Cl.
*G06F 9/00* (2006.01)
*G06F 9/24* (2006.01)
(Continued)

(52) U.S. Cl.
CPC ............ *G06F 9/4416* (2013.01); *G06F 3/067* (2013.01); *G06F 3/0622* (2013.01);
(Continued)

(58) Field of Classification Search
CPC .................................................. G06F 9/4416
See application file for complete search history.

(56) References Cited

U.S. PATENT DOCUMENTS 5,339,444 A 8/1994 Nakajima
5,887,131 A 3/1999 Angelo
(Continued)

FOREIGN PATENT DOCUMENTS

CN 102207881 A 10/2011
CN 104199706 A 12/2014
EP 0487900 A1 6/1992

OTHER PUBLICATIONS

European Search Report, dated Nov. 7, 2016.

*Primary Examiner* — Mohammed Rehman
(74) *Attorney, Agent, or Firm* — Cha & Reiter, LLC

(57) ABSTRACT

An electronic device having an external memory according to various embodiments of the present disclosure may include a communication unit; an internal memory configured to store a first electronic device information of the electronic device and a first booting data in a first booting area, said first booting data is loaded when an electric power is supplied to the electronic device; an external memory configured to store a second electronic device information of the electronic device, firmware corresponding to the electronic device in a firmware storage area, and updated firmware received via the communication unit in a firmware update information storage area; and a controller configured to compare the second electronic device information stored in the external memory and the first electronic device information stored in the internal memory and configured to control to change the firmware in the firmware storage area based on the updated firmware stored in the firmware update information storage area during booting of the electronic device when the first and second electronic device information are not identical.

20 Claims, 13 Drawing Sheets

(51) Int. Cl.
  *G06F 15/177*   (2006.01)
  *G06F 9/4401*   (2018.01)
  *G06F 11/14*    (2006.01)
  *G06F 11/20*    (2006.01)
  *G06F 21/57*    (2013.01)
  *G06F 3/06*     (2006.01)
  *G06F 21/44*    (2013.01)
  *G06F 21/73*    (2013.01)
  *G06F 8/654*    (2018.01)

(52) U.S. Cl.
  CPC ............ *G06F 3/0632* (2013.01); *G06F 8/654* (2018.02); *G06F 9/4403* (2013.01); *G06F 9/4406* (2013.01); *G06F 11/1417* (2013.01); *G06F 11/2094* (2013.01); *G06F 21/44* (2013.01); *G06F 21/572* (2013.01); *G06F 21/575* (2013.01); *G06F 21/73* (2013.01); *G06F 2221/2153* (2013.01)

(56) References Cited

U.S. PATENT DOCUMENTS

| | | | |
|---|---|---|---|
| 5,922,072 A | 7/1999 | Hutchinson et al. | |
| 8,819,330 B1 | 8/2014 | Spangler et al. | |
| 2007/0168691 A1 | 7/2007 | Srivastava et al. | |
| 2007/0226729 A1* | 9/2007 | Ueda | G06F 8/65 717/168 |
| 2008/0065816 A1* | 3/2008 | Seo | G06F 8/65 711/103 |
| 2012/0131228 A1* | 5/2012 | Kim | G06F 9/445 710/5 |
| 2013/0293559 A1* | 11/2013 | Liu | G06T 1/60 345/530 |
| 2014/0215012 A1* | 7/2014 | Kim | G06F 9/445 709/217 |
| 2015/0242202 A1* | 8/2015 | Jun | G06F 8/665 717/168 |
| 2015/0312433 A1* | 10/2015 | Tsuji | G06F 3/1204 358/1.13 |

\* cited by examiner

ELECTRONIC DEVICE HAVING AN EXTERNAL MEMORY AND METHOD FOR OPERATING THE SAME

CLAIM OF PRIORITY

This application claims the benefit under 35 U.S.C. § 119(a) of a Korean patent application filed on Jun. 26, 2015 in the Korean Intellectual Property Office and assigned Serial number 10-2015-0091562, the entire disclosure of which is hereby incorporated by reference.

TECHNICAL FIELD

Various embodiments of the present disclosure relate to an electronic device having a separate external memory and a method for operating the same.

BACKGROUND

An electronic device can be configured with a memory. The memory may be an internal memory included in the electronic device or a removable external memory that may be separately located at the outside of the electronic device and incorporated into the electronic device.

For example, the memory can be configured in various forms such as an eMMC (Embedded Multimedia Card), SD (Secure Digital) card, and UFS (Universal Flash Storage) card. Generally, the eMMC and embedded UFS are used as an internal memory, and memories in a card form such as an SD card, HS card, and UFS card are used as an external memory.

SUMMARY

An eMMC can be integrated in a PCB as an internal memory of an electronic device. If the eMMC becomes defective, the whole PCB must be replaced, which may cause a waste of resources.

The eMMC can store all the information required for operating the electronic device; however, information stored in the eMMC is configured in an integrated PCB and this creates a limitation because the eMMC can be used for only one dedicated electronic device. Namely, if a user replaces the electronic device, the user must copy information stored in the previous electronic device to an internal memory of a different electronic device. Accordingly, the user may experience inconvenience in transferring the information.

Further, the electronic device may be installed with an SD card as an external memory to store information such as user data; however, the slow read/write speed of the SD card can cause inconvenience.

Accordingly, various embodiments of the present disclosure provide an apparatus and a method for storing information separately in an internal memory and an external memory of an electronic device.

Further, various embodiments of the present disclosure provide an apparatus and a method for sharing information stored in an external memory with another electronic device by storing information required for driving the electronic device in the external memory.

In accordance with another aspect of the present invention, an electronic device is provided. The electronic device includes a communication unit, an internal memory configured to store a first electronic device information of the electronic device and a first booting data in a first booting area, said first booting data is loaded when an electric power is supplied to the electronic device, an external memory configured to store a second electronic device information of the electronic device, firmware corresponding to the electronic device in a firmware storage area, and updated firmware received via the communication unit in a firmware update information storage area; and a controller configured to compare the second electronic device information stored in the external memory and the first electronic device information stored in the internal memory, and to control to change the firmware in the firmware storage area based on the updated firmware stored in the firmware update information storage area during booting of the electronic device when the first and second electronic device information are not identical.

In accordance with another aspect of the present invention, a method for operating an electronic device. The method includes: recognizing an internal memory and an external memory when an electric power is supplied, comparing a first electronic device information of the electronic device stored in the internal memory and a second electronic device information of the electronic device stored in the external memory; and changing firmware stored in a firmware storage area of the external memory based on data stored in a firmware update information storage area of the external memory when the first and second electronic device information are not identical according to the comparison result.

BRIEF DESCRIPTION OF THE DRAWINGS

The above and other aspects, features, and advantages of certain embodiment of the present disclosure will be more apparent from the following description taken in conjunction with the accompanying drawings, in which.

DETAILED DESCRIPTION

Figure 1:
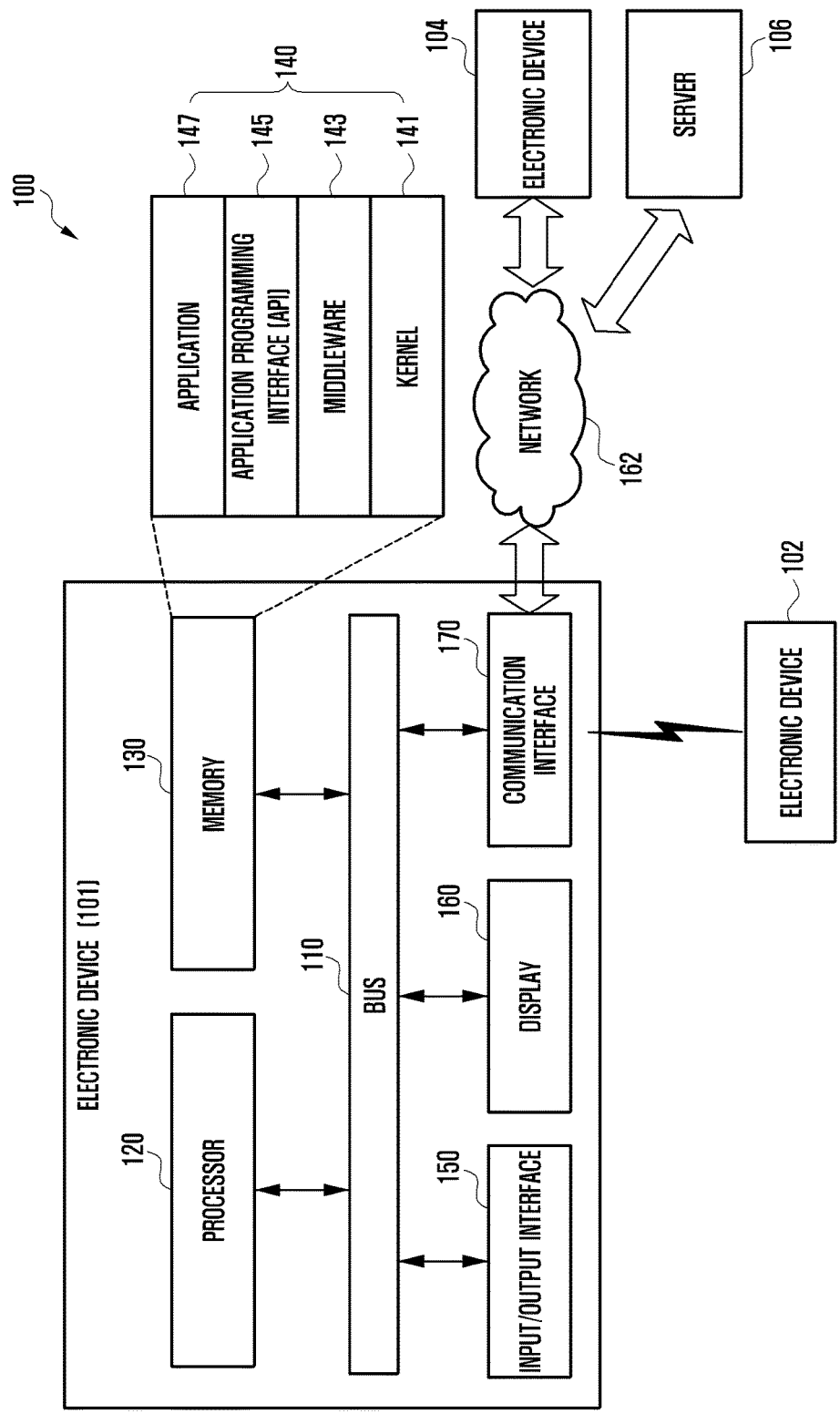
FIG. 1 is a block diagram illustrating an electronic device in a network environment according to various embodiments of the present disclosure.

Hereinafter, embodiments of the present invention will be described in detail with reference to the accompanying drawings. It will be easily appreciated to those skilled in the art that various modifications, additions and substitutions are possible from the embodiment of the present invention, and the scope of the invention should not be limited to the following embodiments. The embodiments of the present invention are provided such that those skilled in the art completely understand the invention. In the drawings, the same or similar elements are denoted by the same reference numerals even though they are depicted in different drawings.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of the addition of one or more other characteristics, numbers, steps, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that not only the component is directly connected or accessed to the other component, but also another component may exist between the component and the other component. Meanwhile, in the case where according to which a component is referred to as being "directly connected" or "directly accessed" to other component, it should be understood that there is no component therebetween.

The terms used in the present disclosure are only used to describe specific various embodiments, and are not intended to limit the present disclosure. Singular forms are intended to include plural forms unless the context clearly indicates otherwise.

Unless otherwise defined, all terms including technical and/or scientific terms used herein have the same meaning as commonly understood by one of ordinary skill in the art to which the invention pertains. In addition, unless otherwise defined, all terms defined in generally used dictionaries may not be overly interpreted.

The electronic device according to the embodiments of the present invention may be a device including a communication function. For example, the electronic device corresponds to a combination of at least one of the followings: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player (e.g., MP3 player), a mobile medical device, a camera, or a wearable device. Examples of the wearable device are a head-mounted-device (HMD) (e.g., electronic eyeglasses), electronic clothing, an electronic bracelet, an electronic necklace, an accessory, an electronic tattoo, a smart watch, etc.

The electronic device according to the embodiments of the present invention may include at least one of the following: the smart home appliances are a television (TV), a Digital Video Disk (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

The electronic device according to the embodiments of the present invention may include at least one of the following: medical devices (e.g., Magnetic Resonance Angiography (MRA), Magnetic Resonance Imaging (MRI), Computed Tomography (CT), a scanning machine, an ultrasonic scanning device, etc.), a navigation device, a Global Positioning System (GPS) receiver, an Event Data Recorder (EDR), a Flight Data Recorder (FDR), a vehicle infotainment device, an electronic equipment for ships (e.g., navigation equipment, gyrocompass, etc.), avionics, a security device, a head unit for vehicles, an industrial or home robot, an automatic teller's machine (ATM), a point of sales (POS) system, etc.

The electronic device according to the embodiments of the present invention may include at least one of the following: furniture or a portion of a building/structure, an electronic board, an electronic signature receiving device, a projector, various measuring instruments (e.g., a water meter, an electric meter, a gas meter and a wave meter), etc., which are equipped with a heart rate measuring function, respectively. The electronic device according to the embodiments of the present invention may also include a combination of the devices listed above. In addition, the electronic device according to the embodiments of the present invention may be a flexible device. It is obvious to those skilled in the art that the electronic device according to the embodiments of the present disclosure is not limited to the aforementioned devices.

Hereinafter, electronic devices according the embodiments of the present invention are described in detail with reference to the accompanying drawings. In the description, the term a 'user' may be referred to as a person or a device that uses an electronic device, e.g., an artificial intelligent electronic device.

FIG. 1 illustrates a network environment 100 including an electronic device 101 according to an embodiment of the present invention. Referring to FIG. 1, the electronic device 101 may include a bus 110, a processor 120, a memory 130, an input/output (I/O) interface 150, a display 160, and a communication interface 170.

The bus 110 may be a communication circuit that connects the components to each other and transfers data (e.g., control messages) between the components.

The processor 120 may receive instructions from the components (e.g., the memory 130, input/output interface 150, display 160, communication interface 170, etc.) via the bus 110, decode them and perform corresponding operations or data processing according to the decoded instructions.

The memory 130 may store instructions or data transferred from/created in the processor 120 or the other components (e.g., the input/output interface 150, display 160, communication interface 170, etc.). The memory 130 may include programming modules, e.g., a kernel 141, middleware 142, application programming interface (API) 145, application module 147, etc. Each of the programming modules may be software, firmware, hardware or a combination thereof.

The kernel 141 may control or manage system resources (e.g., the bus 110, processor 120, memory 130, etc.) used to execute operations or functions of the programming modules, e.g., the middleware 143, API 145, and application module 147. The kernel 141 may also provide an interface that may access and control/manage the components of the electronic device 101 via the middleware 143, API 145, and application module 147.

The middleware 143 may make it possible for the API 145 or application module 147 to perform data communication with the kernel 141. The middleware 143 may also perform control operations (e.g., scheduling, load balancing) for task requests transmitted from the application module 147 by methods, for example, a method for assigning the order of priority to use the system resources (e.g., the bus 110, processor 120, memory 130, etc.) of the electronic device 101 to at least one of the applications of the application module 134.

The API 145 is the interface for the application module 147 to access the function provided by the kernel 141 or the middleware 143 and may include at least one interface or function (e.g. command) for file control, window control, image control, or text control.

The input/output interface 150, for example, may receive a command or data as input from a user via in-output apparatus (e.g., sensor, keyboard, or touchscreen, or the like) and may deliver the received command or data to the processor 120 or the memory 130 through the bus 110. The input/output interface 150 may display a video, an image, data, or the like to the user. The display 160 may be, for example, a Liquid Crystal Display (LCD) and an Active Matrix Organic Light Emitting Diode (AM-OLED) display, microelectromechanical systems (MEMS), electronic paper display and the like. The display 160 may include the touch panel and one module. The display 160 may display the receive various information (e.g., multi-media data, text data) from the above-described elements.

The communication interface 170 may establish a communication connection of the electronic device 101 with an external device (e.g. electronic device 104 and server 106). For example, the communication interface 170 connects to the network 162 through a wireless or wired link for communication with the external device. Examples of the wireless communication technology may include wireless fidelity (Wi-Fi), Bluetooth (BT), Near Field Communication (NFC), Global Positioning System (GPS), and cellular communication technology (e.g. Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment, the network may be a telecommunication network. The communication network may include at least one of computer network, Internet, Internet of Things, and telephone network. According to an embodiment, the communication protocol between the electronic device and an external device (e.g. transport layer protocol, data link layer protocol, and physical layer protocol) may be supported by at least one of the applications, API, middleware, kernel, and communication interface.

Figure 2:
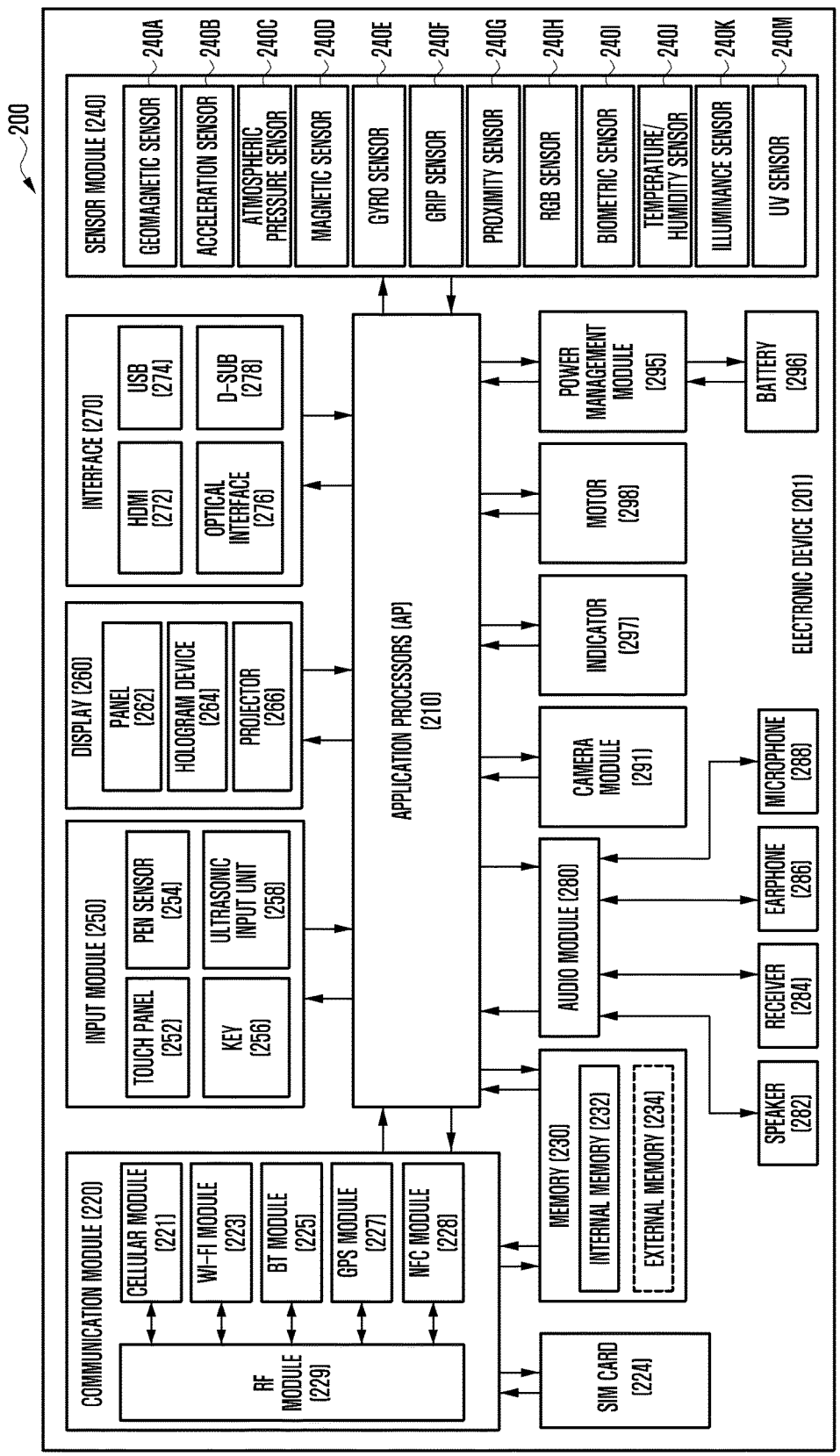
FIG. 2 is a block diagram illustrating a configuration of an electronic device according to various embodiments of the present disclosure.

FIG. 2 is a block diagram illustrating a configuration of hardware 200 according to an embodiment of the present disclosure.

The hardware 200 may be, for example, the electronic device 101 illustrated in FIG. 1.

Referring to FIG. 2, the hardware 200 may include one or more processors 210, a Subscriber Identification Module (SIM) card 224, a memory 230, a communication module 220, a sensor module 240, a user input module 250, a display module 260, an interface 270, an audio coder/decoder (codec) module 280, a camera module 291, a power management module 295, a battery 296, an indicator 297, a motor 298 and any other similar and/or suitable components.

The processor 210 (e.g., the processor 120) may include one or more Application Processors (APs), or one or more Communication Processors (CPs). The processor 210 may be, for example, the processor 120 illustrated in FIG. 1. The AP and the CP may be included in different Integrated Circuit (IC) packages, respectively. According to an embodiment of the present disclosure, the AP and the CP may be included in one IC package.

The communication module 220 (e.g. communication interface 170) may perform data communication with other electronic devices (e.g. electronic device 104 and server 106) through a network. According to an embodiment, the communication module 220 may include a cellular module 221, a Wi-Fi module 223, a BT module 225, a GPS module 227, an NFC module 228, and a Radio Frequency (RF) module 229.

The cellular module 221 is responsible for voice and video communication, text messaging, and Internet access services through a communication network (e.g. LTE, LTE-A, CDMA, WCDMA, UMTS, WiBro, and GSM networks). The cellular module 221 may perform identification and authentication of electronic devices in the communication network using the SIM card 224. According to an embodiment, the cellular module 221 may perform at least one of the functions of the processor 210. For example, the cellular module 221 may perform at least a part of the multimedia control function.

According to an embodiment, the cellular module 221 may include a Communication Processor (CP). The cellular module 221 may be implemented in the form of SOC. Although the cellular module 221 (e.g. communication processor), the memory 230, and the power management module 295 are depicted as independent components separated from the processor 210, the present invention is not limited thereto but may be embodied in a way that the processor includes at least one of the components (e.g. cellular module 221).

According to an embodiment, each of the processor 210 and the cellular module 221 (e.g. communication processor) may load a command or data received from at least one of the components on a non-volatile or volatile memory and process the command or data. The processor 210 or the cellular module 221 may store the data received from other components or generated by at least one of other components in the non-volatile memory.

Each of the Wi-Fi module 223, the BT module 225, the GPS module 227, and the NFC module 228 may include a processor for processing the data it transmits/receives. Although the cellular module 221, the Wi-Fi module 223, the BT module 225, the GPS module 227, and the NFC module 228 are depicted as independent blocks; at least two of them (e.g. communication processor corresponding to the cellular module 221 and Wi-Fi processor corresponding to the Wi-Fi module 223) may be integrated in the form of SoC. The RF module 229 is responsible for data communication, e.g. transmitting/receiving RF signals. Although not depicted, the RF module 229 may include a transceiver, a Power Amp Module (PAM), a frequency filter, and a Low Noise Amplifier (LNA). The RF module 229 also may include the elements for transmitting/receiving electric wave in free space, e.g. conductor or conductive wire. Although FIG. 2 is directed to the case where the Wi-Fi module 223, the BT module 225, the GPS module 227, and the NFC module 228 are sharing the RF module 229, the present invention is not limited thereto but may be embodied in a way that at least one of the Wi-Fi module 223, the BT module 225, the GPS module 227, and the NFC module 228 transmits/receives RF signals an independent RF module.

The memory 230 (e.g. memory 130) may include at least one of the internal memory 232 and an external memory 234. The internal memory 232 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory). According to an embodiment, the internal memory 232 may be a Solid State Drive (SSD). The external memory 234 may be a flash drive such as Compact Flash (CF), Secure Digital (SD), micro-SD, Mini-SD, extreme Digital (xD), and Memory Stick. The external memory 234 may be connected to the electronic device 101 through various interfaces functionally. According to an embodiment, the electronic device 101 may include a storage device (or storage medium) such as hard drive.

The sensor module 240 may measure physical quantity or check the operation status of the electronic device 101 and convert the measured or checked information to an electric signal. The sensor module 240 may include at least one of gesture sensor 240A, Gyro sensor 240B, atmospheric pressure sensor 240C, magnetic sensor 240D, acceleration sensor 240E, grip sensor 240F, proximity sensor 240G, color sensor 240H (e.g. Red, Green, Blue (RGB) sensor), bio sensor 240I, temperature/humidity sensor 240J, illuminance sensor 240K, and Ultra Violet (UV) sensor 240M. Additionally or alternatively, the sensor module 240 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 240 may further include a control circuit for controlling at least one of the sensors included therein.

The input module 250 may include a touch panel 252, a (digital) pen sensor 254, keys 256, and an ultrasonic input device 258. The touch panel 252 may be one of capacitive, resistive, infrared, microwave type touch panel. The touch panel 252 may include a control circuit. In the case of the capacitive type touch panel, it is possible to detect physical contact or approximation. The touch panel 252 may further include a tactile layer. In this case, the touch panel 252 may provide the user with haptic reaction. The (digital) pen sensor 254 may be implemented with a sheet with the same or similar way as touch input of the user or a separate recognition sheet. The keys 256 may include physical buttons, optical key, and keypad. The ultrasonic input device 258 is a device capable of checking data by detecting sound wave through a microphone 288 and may be implemented for wireless recognition. According to an embodiment, the electronic device 101 may receive the user input made by means of an external device (e.g. computer or server) connected through the communication module 220.

The display 260 (e.g. display 160) may include a panel 262, a hologram device 264, and a projector 266. The panel 262 may be a Liquid Crystal Display (LCD) panel or an Active Matrix Organic Light Emitting Diodes (AMOLED) panel. The panel 262 may be implemented so as to be flexible, transparent, and/or wearable. The panel 262 may be implemented as a module integrated with the touch panel 252. The hologram device 264 may present 3-dimensional image in the air using interference of light. The projector 266 may project an image to a screen. The screen may be placed inside or outside the electronic device. According to an embodiment, the display 260 may include a control circuit for controlling the panel 262, the hologram device 264, and the projector 266.

The interface 270 may include a High-Definition Multimedia Interface (HDMI) 272, a Universal Serial Bus (USB) 274, an optical interface 276, and a D0subminiature (D-sub) 278. The interface 270 may include the communication interface 160 as shown in FIG. 1. Additionally or alternatively, the interface 270 may include a Mobile High-definition Link (MHL) interface, a SD/MMC card interface, and infrared Data Association (irDA) standard interface.

The audio module 280 may convert sound to electric signal and vice versa. At least a part of the audio module 280 may be included in the input/output interface 150 as shown in FIG. 1. The audio module 280 may process the audio information input or output through the speaker 282, the receiver 284, the earphone 286, and the microphone 288.

The camera module 291 is a device capable of taking still and motion pictures and, according to an embodiment, includes at least one image sensor (e.g. front and rear sensors), a lens (not shown), and Image Signal Processor (ISP) (not shown), and a flash (e.g. LED or xenon lamp) (not shown).

The power management module 295 may manage the power of the electronic device 201. Although not shown, the power management module 295 may include a Power Management Integrated Circuit (PMIC), a charger Integrated Circuit (IC), a battery, and a battery or fuel gauge.

The indicator 297 may display operation status of the electronic device 101 or a part of the electronic device, booting status, messaging status, and charging status. The motor 298 may converts the electronic signal to mechanical vibration. Although not shown, the electronic device 201 may include a processing unit (e.g. GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

Figure 3:
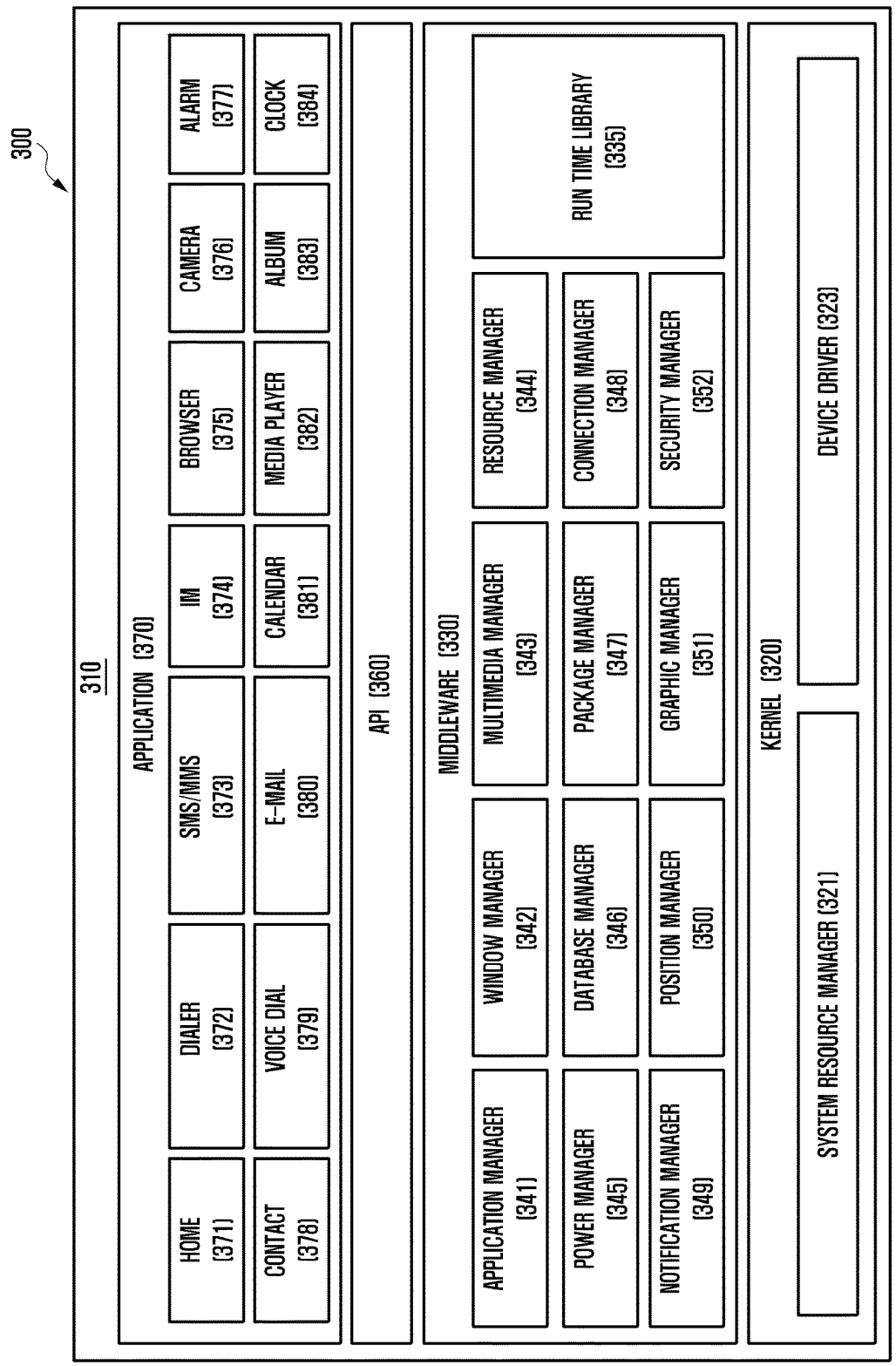
FIG. 3 is a block diagram illustrating a configuration of a program module according to various embodiments of the present disclosure.

FIG. 3 is a block diagram illustrating a configuration of a program module according to various embodiments of the present disclosure.

According to an embodiment, the program module 310 (e.g., program module 140 shown in FIG. 1) is capable of including an operation system (OS) for controlling resources related to the electronic device (e.g., electronic device 101) and/or various applications (e.g., application module 147 shown in FIG. 1) running on the OS. The OS may be Android, iOS, Windows, Symbian, Tizen, Bada, etc.

The programming module 310 may include a kernel 320, a middleware 330, an Application Programming Interface (API) 360, or an application 370.

The kernel 320 (for example, kernel 141) may include a system resource manager 321 or a device driver 323. The system resource manager 321 may include, for example, a process manager, a memory manager, or a file system manager. The system resource manager 321 may perform a system resource control, allocation, or recall. The device driver 323 may include, for example, a display driver, a camera driver, a Bluetooth driver a shared memory driver, a USB driver, a keypad driver, a WiFi driver, or an audio driver. Further, according to an embodiment, the device driver 322 may include an Inter-Process Communication (IPC) driver (not shown).

The middleware 330 may include a plurality of modules prepared in advance to provide a function required in common by the applications 370. Further, the middleware 330 may provide a function through the API 360 to allow the application 370 to efficiently use limited system resources within the electronic device. For example, as illustrated in FIG. 3, the middleware 330 (for example, middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352. The runtime library 335 may include, for example, a library module used by a complier to add a new function through a programming language while the application 370 is executed. According to an embodiment, the runtime library 335 may execute input and output, management of a memory, a function associated with an arithmetic function or the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 may manage resources such as a source code, a memory, or a storage space of at least one of the applications 370.

The power manager 345 may operate together with a Basic Input/Output System (BIOS) to manage a battery or power and provide power information required for the operation. The database manager 320F may manage generation, search, or change of a database to be used by at least one of the applications 370. The package manager 347 may manage an installation or an update of an application distributed in a form of a package file. The connectivity manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 may provide a general security function required for a system security or a user authentication. According to an embodiment, when the electronic device (for example, electronic device 101) has a call function, the middleware 330 may further include a telephony manager (not shown) for managing a voice of the electronic device or a video call function.

The API 360 (for example, API 145) is a set of API programming functions, and may be provided with a different configuration according to an operating system. For example, in Android or iOS, a single API set may be provided for each platform. In Tizen, two or more API sets may be provided. The applications 370 (for example, application module 147) may include, for example, a preloaded application or a third party application.

At least some of the programming module 300 may be implemented by a command stored in a computer-readable storage medium. When the command is executed by one or more processors (for example, processor 210), the one or more processors may perform a function corresponding to the command. The computer-readable storage medium may be, for example, the memory 230. At least some of the programming module 300 may be implemented (for example, executed) by, for example, the processor 210. At least some of the programming module 300 may include, for example, a module, a program, a routine, sets of instructions, or a process for performing one or more functions.

The term "module" used in embodiments of the present invention disclosure may refer to, for example, a "unit" including one of hardware, software, and firmware, or a combination of two or more thereof. The term "module" may be interchangeable with a term such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter. The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se. In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

According to various embodiments of the present disclosure, at least some of the devices (for example, e.g., modules or functions thereof) or the method (for example, e.g., operations) according to the present disclosure may be implemented by a command stored in a non-transitory computer-readable storage medium in a programming module form. When the command is executed by one or more processors (for example, e.g., the processor), the one or more processors may execute a function corresponding to the command. The non-transitory computer-readable storage medium may be, for example, the memory 130. At least a part of the programming module may be implemented (for example, e.g., executed) by, for example, the processor 210. At least a part of the programming module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, e.g., programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

Figure 4:
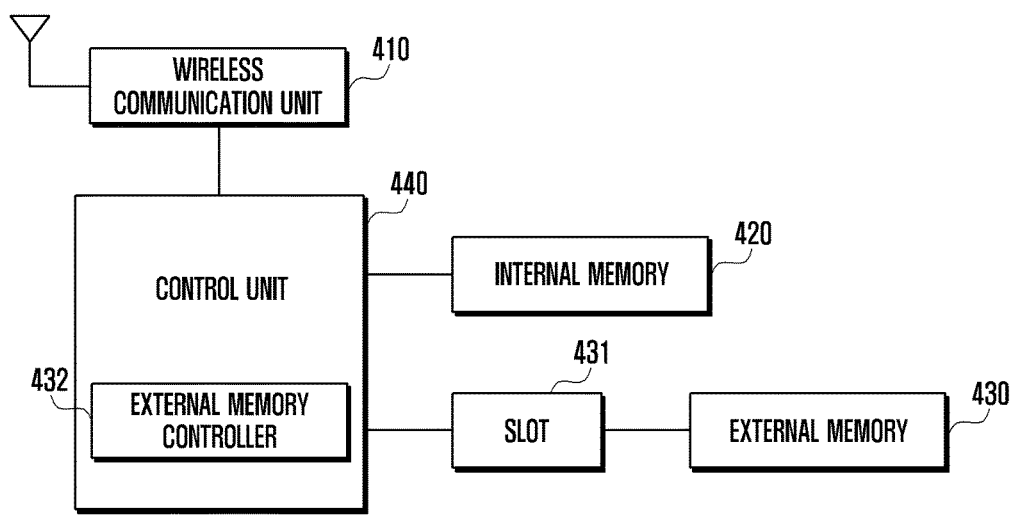
FIG. 4 is a block diagram illustrating a configuration of an electronic device according to an embodiment of the present disclosure.

FIG. 4 is a block diagram illustrating a configuration of an electronic device according to an embodiment of the present disclosure.

Referring to FIG. 4, the electronic device may be configured with a wireless communication unit 410, internal memory 420, external memory 430, control unit 440, and slot 431. The electronic device may be the same as the electronic device 101 in FIG. 1. The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

The wireless communication unit 410 may include at least one module enabling wireless communication between an electronic device and a wireless communication system or between an electronic device and another electronic device located in a network. For example, the wireless communication unit 410 may be configured with at least one of a mobile communication module, WLAN (Wireless Local Area Network) module, near-field communication module, location calculating module, and broadcast receiving module. Particularly in an embodiment of the present disclosure, the wireless communication unit 410 can perform a wireless communication operation for storing firmware of a different electronic device. For example, the wireless communication unit 410 can perform a wireless communication operation such as a 3G, 4G, and Wi-Fi in order to store firmware corresponding to a different electronic device.

In an embodiment of the present disclosure, the wireless communication unit 410 can communicate with a server and download firmware of a different electronic device from the server.

The internal memory 420 can store data. Particularly in an embodiment of the present disclosure, the internal memory 420 can store only the essential configuration elements required for configuring the electronic device. Accordingly, the internal memory 420 may be configured with a small capacity (for example, 50 MB) so that only the essential configuration elements can be stored.

In an embodiment of the present disclosure, the essential configuration elements may include a booting area such as a boot loader for booting an electronic device and specific information for recognizing an electronic device. At least one of the essential configuration element may include information for recognizing an electronic device. The boot loader may include information determined at an initial step of setting an electronic device but may also not require the information. For example, the boot loader may include information for recognizing a model of an electronic device. The specific information may be unique information of each electronic device. For example, the specific information may include a model name, serial number, RF calibration information, battery calibration information, and LCD information of an electronic device.

The slot 431 may be a configuration element prepared for inserting the external memory 430 into the electronic device. For example, the slot 431 may be configured in a grooved form. The electronic device can be combined with the external memory 430 through the slot 431. In more detail, the electronic device has a structure including the slot 431 and the external memory 430 can be inserted into the slot 431.

The external memory 430 operates as a memory of the electronic device and can store the remaining configuration elements except the essential configuration elements stored in the internal memory 420.

For example, the remaining configuration elements are loaded sequentially or simultaneously after loading the booting area stored in the internal memory 420 and may include operating system information required for driving the system of the electronic device, user information stored by a user, firmware update information storage area, and security information required for the security of the electronic device. The external memory 430 may have a bigger capacity than the internal memory 420 in order to store a large amount of information.

In an embodiment of the present disclosure, the internal part of the external memory 430 may be divided into a plurality of partition areas. The plurality of partition areas may be recognized as if the electronic device has a plurality of external memories. Each partition existing in the plurality of partition areas can store individually different programs and information. If necessary, the external memory 430 can store different programs and information by configuring into a plurality of partition areas.

In an embodiment of the present disclosure, the external memory 430 may include a booting area for booting the electronic device. The booting area may be assigned to a partition area among the plurality of partition areas. For example, the booting area can store data and programs for booting the electronic device and may further include information for recognizing a model of an electronic device which may be not essential.

In an embodiment of the present disclosure, the external memory 430 may be a UFS (Universal Flash Memory) card having an area for booting the electronic device. Further, any kind of external memory having a booting area can be used without being limited to this. For example, if an SD card has a booting area, the SD card can be used as the external memory 430. The booting area may be an area for storing a boot loader configured to boot the electronic device.

The control unit 440 can be configured with an external memory controller 432. The control unit 440 can control general operations of the electronic device. The control unit 440 may have the same configuration as the processor 120 shown in FIG. 1; however, the term "control unit" is used as a common name hereinafter. If an external memory 430 is connected to the electronic device, the external memory controller 432 can recognize the external memory 430. The external memory controller 432 can control the operation of the external memory 430. In the following description, the operation of the external memory controller 432 is regarded as the operation of the control unit 440. Accordingly, the operation of the control unit 440 may include the operation of the external memory controller 432.

In an embodiment of the present disclosure, the control unit 440 can recognize an external memory 430 inserted in the slot 431 if a power is supplied to the electronic device. Here, the external memory 430 is configured with a plurality of partition areas so that diversified information can be stored separately, and one of the partition areas can include a booting area to boot the electronic device. The control unit 440 can load a booting area stored in an internal memory and a booting area stored in an external memory sequentially or simultaneously. Subsequently, the control unit 440 can control to compare a model name of an electronic device stored in the internal memory 420 and a model name of the electronic device stored in the external memory 430.

In an embodiment of the present disclosure, the external memory 430 can be set to store a model name of a different electronic device in one of the plurality of partition areas so that it can operate when inserted into the electronic device. For example, the external memory 430 can store information for recognizing a model of an electronic device. Accordingly, the control unit 440 can compare a model name of an electronic device stored in the internal memory 420 and a model name of the electronic device stored in the external memory 430. Here, one or more model names of electronic devices can be stored in the external memory 430. The model name can be replaced with another kind of specific information which can distinguish electronic devices. If a plurality of model names of the electronic device is stored in external memory 430, the model names can be stored in each partition or in different partitions.

In an embodiment of the present disclosure, the external memory 430 can store the model name of the electronic device in a binary form. Namely, the control unit 440 may not access to corresponding information stored in a file system used by an operating system but directly to a specific binary address.

In an embodiment of the present disclosure, the control unit 440 can control to store firmware version (binary information) corresponding to a different model name of an electronic device (for example, a different electronic device) in the firmware update information storage area of the external memory 430. Namely, the control unit 440 can update firmware stored in the firmware update information storage area of the external memory 430.

The control unit 440 can update information of other partition areas based on the firmware stored in the firmware update information storage area. In an embodiment of the present disclosure, the specific information of the internal memory can be reflected to an operating system information area (one of firmware storage areas) of the external memory after the firmware update is completed. The specific information is one of the essential configuration elements and may be unique information owned by each electronic device. For example, the specific information may include a model name, serial number, RF calibration information, battery calibration information, and LCD information of an electronic device. If the firmware update is completed, the control unit 440 can reboot the electronic device.

In an embodiment of the present disclosure, the firmware update information storage area can be used not only for updating the operating system version of the electronic device but also for moving firmware between electronic devices of different models. Here, the operating system versions may be identical or different.

In an embodiment of the present disclosure, the control unit 440 can control to perform user authentication while booting or rebooting the electronic device. For example, the control unit 440 can display a popup window guiding to input security information such as a user code or a fingerprint in a rebooting process as a user authentication function. Subsequently, the control unit 440 can complete the booting of the electronic device if the security information input by a user through the popup window is identical to security information stored in the external memory.

In the meantime, the control unit 440 can boot the electronic device if a model name of an electronic device stored in the internal memory is identical to a model name of an electronic device stored in the external memory.

Figure 5:
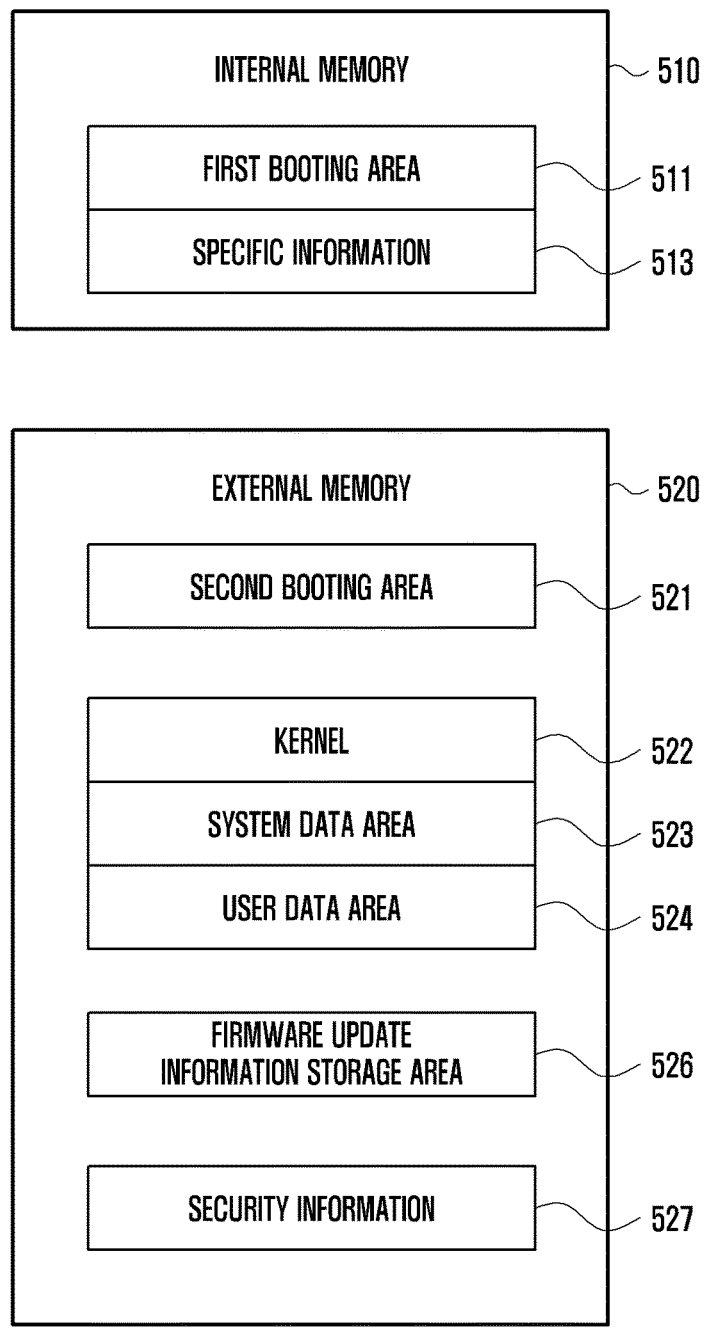
FIG. 5 is a block diagram illustrating a configuration of a memory according to an embodiment of the present disclosure.

FIG. 5 is a block diagram illustrating a configuration of a memory according to an embodiment of the present disclosure.

Referring to FIG. 5, the electronic device may include an internal memory 510 and an external memory 520. In the following embodiments, it is assumed that the external memory 520 is inserted into the electronic device through a slot 431.

The internal memory 510 can store only the essential configuration elements required for configuring the electronic device. In an embodiment of the present disclosure, it is assumed that the essential configuration element includes a first booting area 511 and specific information 513; however, another configuration element can be included without limitations. The first booting area 511 may include information initially set by a processor manufacturer to boot an electronic device. For example, the first booting area 511 may be a boot loader. The specific information is one of the essential configuration elements and may be unique information owned by each electronic device. For example, the specific information may include a model name, serial number, RF calibration information, battery calibration information, and LCD information of an electronic device.

The first booting area 511 contains essential configuration elements and data in the first booting area 511 can be firstly loaded into a RAM if an electric power is supplied to the electronic device. Data in the first booting area 511 can be loaded into a RAM from a specific address (for example, address 0) to a predetermined address. For example, data in the first booting area 511 can be set by a processor manufacturer. Namely, information stored in the first booting area may be firstly set for the electronic device, and the first booting area 511 may include RAM information and PM information.

The specific information 513 may be unique for each electronic device as another essential configuration element. For example, the specific information 513 may include a model name, serial number, RF calibration information, battery calibration information, and LCD information of an electronic device.

The internal parts of the external memory 520 is configured with a plurality of partition areas, and each partition area may store different information. The external memory 520 can store the remaining configuration elements in each partition area by excluding information stored in the internal memory for driving the electronic device. Here, the remaining configuration elements may include at least one of a firmware storage area, user data area 524, firmware update information storage area 526, and security information area 527. The firmware storage area may include a second booting area 521, kernel 522, and system data 523.

In an embodiment of the present disclosure, the user data in user data area 524 may be stored in a third external memory or a server.

The second booting area 521 is separated from the first booting area 511 and may be configured to boot the electronic device. For example, the second booting area 521 may be a boot loader or Sboot. The second booting area 521 can provide information for distinguishing a model (type) of the electronic device. For example, the second booting area 521 may include information set by an electronic device manufacturer; however, it may not be essential.

In an embodiment of the present disclosure, instructions or data stored in the second booting area 521 can be executed after executing the same stored in the first booting area 511. The first booting area 511 and the second booting area 521 may contain boot loaders. Therefore, a plurality of boot loaders can be executed by loading sequentially into a RAM from a specific address (for example, address 0). For example, the electronic device can execute data in the first booting area by loading into the RAM from the address 0 of the internal memory. The first booting area (first boot loader) can be executed by loading from a specific address (address 0) of the internal memory into the RAM. Similarly, the second booting area (second boot loader) can be executed by loading into the RAM. In the meantime, it has been described such that a manufacturer of the first booting area 511 and a manufacturer of the second booting area 521 are different; however, the processor manufacturer and the electronic device manufacturer may be identical.

The kernel 522 stores a kernel operating system of an electronic device. The kernel operating system may be a core operating system such as a Linux kernel or a Unix kernel.

The system data 523 operates based on the kernel operating system of the electronic device and includes middleware for driving an upper level application program and framework operating system data. For example, the system data 523 may be a combination of Android framework data, iOS framework data, and application programs pre-installed by a manufacturer.

The kernel 522 and the system data 523 may be used as a common term "operating system information" in the embodiments of the present disclosure. The second booting area 521 and the operating system information may be a firmware storage area of the external memory 520.

The user data in user data area 524 may be information stored by a user in the process of operating the electronic device. For example, the user data in user data area 524 may include application, image, video, and music files down loaded by the user.

In an embodiment of the present disclosure, the firmware may be divided into 2 kinds. The first one is firmware of the current electronic device and the other one is firmware updated for use by the same or a different electronic device based on the information stored in a firmware update information storage area.

The firmware update information storage area 526 may be an area storing information (for example, software, operation recording program, and data) for updating firmware of the same or a different electronic device (for example, electronic device to which an external memory will be transferred).

In an embodiment of the present disclosure, the firmware update information storage area 526 can store information (for example, software, operation recording program, and data) in order to update the firmware stored in the firmware storage area corresponding to a version of a different electronic device. In this case, the firmware update information storage area 526 may store information required for updating to various firmware versions.

In an embodiment of the present disclosure, the firmware update information storage area 526 can store data files for updating the firmware. The delta file may include an update engine (program) as a software module for updating the firmware. Accordingly, when updating the firmware the firmware update information storage area 526 can update the firmware under the control of the control unit 440 by loading the update engine (program) of the firmware update information storage area 526 into a RAM of the electronic device. Namely, the firmware can be updated by storing delta information of the firmware update information storage area 526.

The firmware update information storage area 526 can support to store partition area information based on binary form firmware stored in itself so that information of other partition areas of the external memory 520 corresponds to that of the electronic device. For example, if the firmware is version 4 and other partition areas have version 3, the other partitions can be updated to version 4 under the control of the control unit 440.

The security information in security information area 527 may be information predetermined for authenticating data of a user, electronic device, and external memory when booting the electronic device. For example, the security information may include information for user authentication such as a user code and a fingerprint. The security information can be stored by encrypting.

Figure 6:
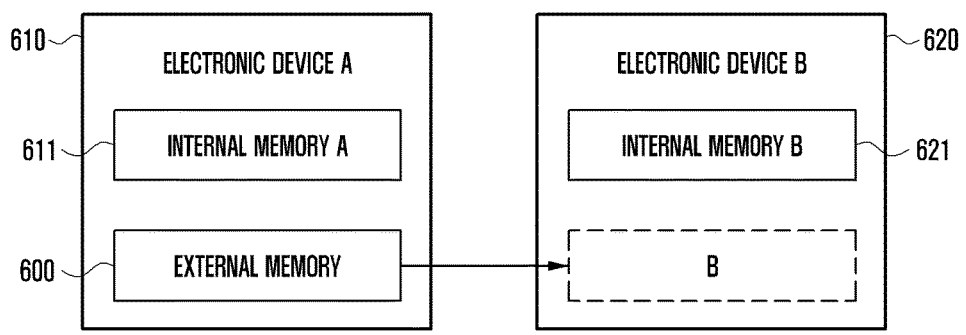
FIG. 6 is a block diagram illustrating an operation of sharing an external memory in a plurality of electronic devices according to an embodiment of the present disclosure.

FIG. 6 is a block diagram illustrating an operation of sharing an external memory in a plurality of electronic devices according to an embodiment of the present disclosure.

The operation of sharing an external memory between electronic devices according to an embodiment of the present disclosure will be described referring to FIG. 6. In the following embodiment, it is assumed that an external memory 600 configured in the existing electronic device 610 is moved to a location B of another electronic device 620. Although a configuration of the different electronic device 620 is not shown in the drawing, the location B may be a slot provided in a grooved form for inserting an external memory into the other electronic device 620.

Accordingly, an external memory 600 can be alternatively used with at least one of electronic devices 610 and 620.

In an embodiment of the present disclosure, the electronic device A 610 and the electronic device B 620 may be configured with an external memory 600 including a booting area for the electronic device. Accordingly, the electronic device A 610 and the electronic device B 620 can control the external memory 600. Although not shown in the drawing, the electronic device A 610 and the electronic device B 620 may be configured with a slot for receiving the external memory 600. Accordingly, the electronic device A 610 and the electronic device B 620 can be combined with the external memory 600 through the slot.

In an embodiment of the present disclosure, the electronic device A 610 may be configured with an internal memory A 611 and the external memory 600 can be embedded inside the electronic device A 610. The electronic device A 610 can store only the essential configuration elements such as a booting area and specific AP information in the internal memory 611 and the remaining configuration elements in the external memory 600. For example, the remaining configuration elements may include a firmware storage area configured with a booting area and an operating system area, user data area, firmware update information storage area, and security information area.

If the external memory 600 used in the electronic device A 610 is inserted into the electronic device B 620, the external memory 600 including the remaining configuration elements can provide information used in the electronic device A 610 for the electronic device B 620.

Accordingly, a different electronic device (for example, electronic device B 620) can utilize information of the external memory used in the previous electronic device (for example, electronic device A 610).

In an embodiment of the present disclosure, the external memory 600 can be moved and used for a different electronic device (for example, electronic device B 620) periodically or according to a user's request. For example, if the user replaces the existing electronic device with a different electronic device, the external memory used in the existing electronic device can be used in the different electronic device.

Here, it is assumed that the external memory 600 stores firmware corresponding to the different electronic device (for example, electronic device B 620) in the firmware update information storage area. If the external memory 600 is moved to a different electronic device and an electric power is supplied to the different electronic device, the firmware storage area can be updated based on the firmware stored in the firmware update information storage area. Accordingly, information of the different electronic device can be stored in the firmware storage area.

As described above, the different electronic device (for example, B electronic device 620) can use the external memory by resetting the firmware corresponding to the different electronic device.

In the process of sharing an external memory, information stored in the external memory can be replaced with a version corresponding to the different electronic device. For example, based on a firmware version (for example, version 2) stored in the firmware update information storage area, the external memory 600 can update an operating system area of another partition from version 1 to version 2. The storage of a version can be performed under the control of the control unit 440.

In an embodiment of the present disclosure, the existing electronic device (for example, electronic device A 610) can receive firmware of a different electronic device (for example, electronic device B 620) and store in the firmware update information storage area through wireless communication when the external memory 600 is connected.

Figure 7A:
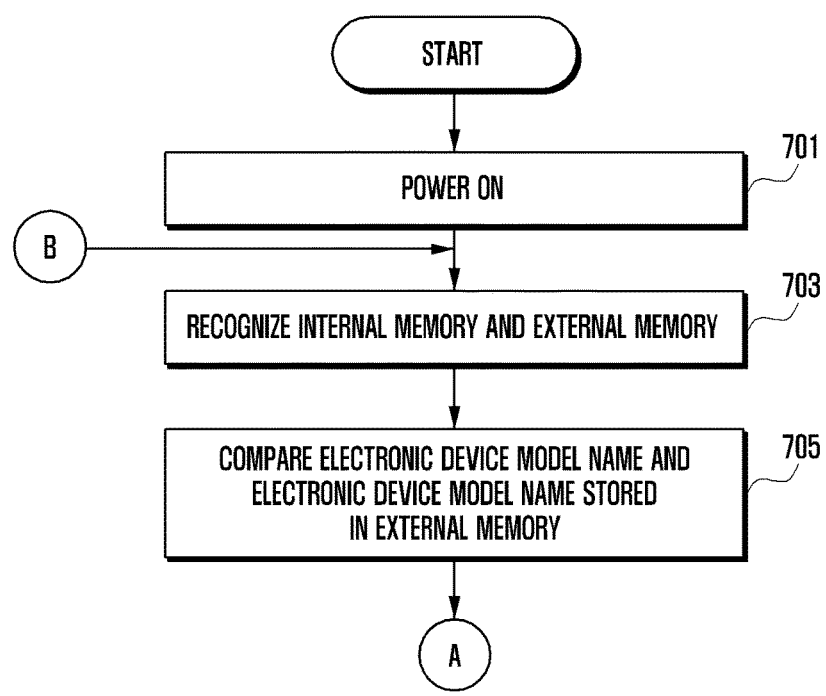
FIG. 7A and FIG. 7B are flowcharts illustrating an operation of recognizing a new external memory according to an embodiment of the present disclosure.
Figure 7B:
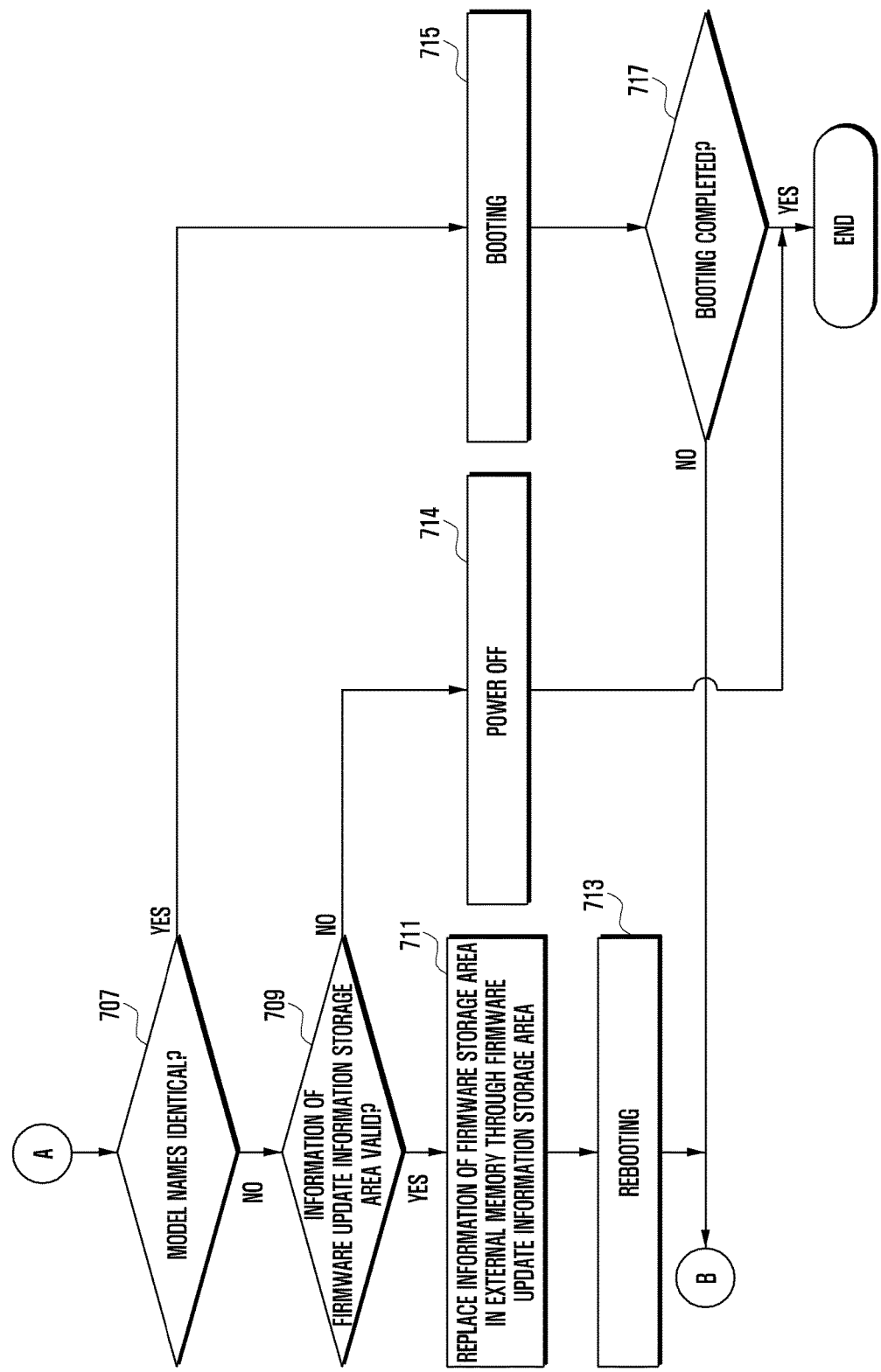

FIGS. 7A and 7B are flowcharts illustrating an operation of recognizing a new external memory according to an embodiment of the present disclosure.

Referring to FIGS. 4 and 7A, a procedure of controlling an external memory while booting the electronic device by supplying an electric power will be described. In an embodiment of the present disclosure, the electronic device being supplied with an electric power can recognize a new external memory 430.

If the power of the control unit 440 is switched on at operation 701, the control unit recognizes an internal memory 420 and an external memory 430 at operation 703. Here, the internal memory stores only the essential configuration elements required for driving the electronic device, and the external memory stores the remaining configuration elements. The essential configuration elements may include a booting area and specific information. By storing only the essential configuration elements in the internal memory in this way, the internal memory can be configured with a small capacity. The external memory stores various configuration elements and may be configured with a bigger capacity than the internal memory.

The internal parts of the external memory 430 is divided into a plurality of partition areas, and each partition area may store different information. Further, the external memory 430 can store the remaining configuration elements excluding essential configuration elements stored in the internal memory 420. For example, the remaining configuration elements may include a firmware storage area such as a booting area and operating system information area, user data area, firmware update information storage area, and security information area.

The control unit 440 can load data in a first booting area stored in the internal memory 420 and data in a second booting area stored in the external memory 430. Namely, the booting areas can be loaded sequentially from a specific address (for example, address 0). Like this, the control unit 440 can boot the electronic device by loading data in the first booting area and the second booting area. The first booting area and the second booting area can be separated, and the booting areas may be configured with boot loaders.

The control unit 440 compares a model name of an electronic device stored in the internal memory 420 and a model name of an electronic device stored in the external memory 430 at operation 705.

In an embodiment of the present disclosure, the internal memory 420 can store the model name of the electronic device in a specific information area. Here, the specific information may be unique information owned by each electronic device. For example, the specific information may include a model name, serial number, RF calibration information, battery calibration information, and LCD information of an electronic device.

The external memory 430 can store a model name of an electronic device in the firmware storage area, which can be read by the electronic device. The external memory 430 can replace its own information so that the model name of the electronic device stored in the external memory becomes identical to the model name of the electronic device stored in the internal memory.

In an embodiment of the present disclosure, the control unit 440 can compare identification information (for example, model name) of an electronic device stored in the booting area of the internal memory and identification information (for example, model name) of an electronic device stored in the booting area of the external memory. By using the identification information of the electronic devices, it can be identified whether the electronic devices respectively registered in the internal memory and the external memory are identical.

The following operations will be described referring to FIGS. 4 and 7B.

Referring to FIGS. 4 and 7B, the control unit 440 identifies whether the model name of the electronic device stored in the internal memory 420 and the model name of the electronic device stored in the external memory 430 are identical at operation 707.

If the model names are not identical, the control unit 440 identifies whether information stored in the firmware update information storage area of the external memory 430 is valid at operation 709. The control unit 440 can identify whether the firmware is updatable based on software binary information stored in the firmware update information storage area. For example, the control unit 440 can read the stored software binary information and identify whether the firmware is updatable. Here, the software binary information can be a base of determining to update the firmware stored in the firmware storage area of the external memory 430 by using the data stored in the firmware update information storage area.

If the information stored in the firmware update information storage area of the external memory 430 is valid, the control unit 440 replaces the information stored in the firmware storage area of the external memory 430 based on data in the firmware update information storage area at operation 711. The information of the firmware storage area may be operating system information configured with a plurality of partitions in the external memory such as a second booting area, kernel, and system data. Accordingly, the control unit 440 can update the operating system information of the external memory using data in the firmware update information storage area. If the settings of the external memory are completed, the control unit 440 reboots the system of the electronic device at operation 713. The control unit 440 can provide a new environment for the operation of the electronic device through the rebooting.

In an embodiment of the present disclosure, specific information stored in the internal memory can be conformed to the operating system information stored in the firmware storage areas of the external memory, after completing a firmware update by using a newly inserted external memory. Namely, the control unit 440 can copy into the internal memory specific information for a newly installed kernel driver from a different electronic device. Subsequently, the control unit 440 can change the settings of the external memory to be used for a different electronic device. In the meantime, if the information stored in the firmware update information storage area of the external memory 430 is invalid, the control unit 440 switches off the electric power at operation 714. For example, a corresponding function may be a function informing a user through a UX (User Experience; a screen display or an alarm sound output) that the firmware update cannot be performed.

If the model names of the electronic device are identical, the control unit 440 continues the booting according to a supply of an electric power to the electronic device at operation 707.

The control unit 440 identifies whether the booting is completed through the above process at operation 717. The control unit 440 can repeat the above process until the booting is completed. If the booting cannot be completed, the control unit 440 returns to operation 703 of FIG. 7A and performs the operation of recognizing a memory of the electronic device.

The control unit 440 can perform a user authentication process while booting the electronic device. Here, the user authentication process can be set so as to solve the problems of exposing personal information and to improve the security of the external memory 430. The user authentication process will be described in more detail in the following embodiments.

Figure 8:
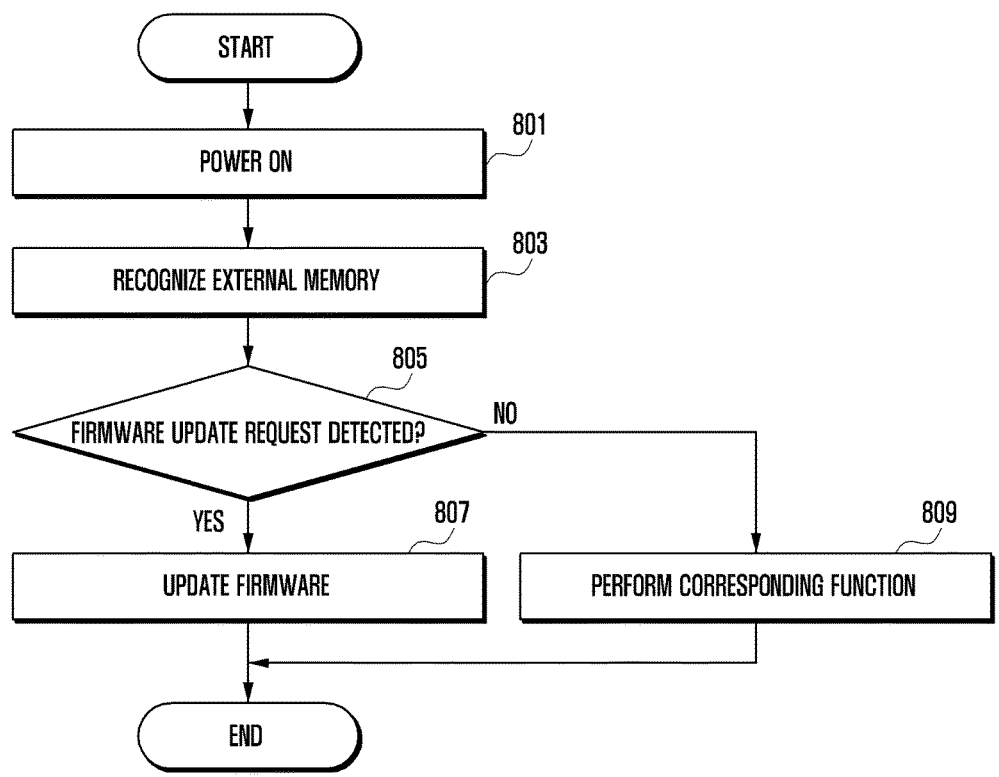
FIG. 8 is a flowchart illustrating a procedure of storing electronic device information in an external memory according to an embodiment of the present disclosure.

FIG. 8 is a flowchart illustrating a procedure of storing electronic device information in an external memory according to an embodiment of the present disclosure.

The following description related to FIG. 8 assumes that the electronic device is currently operating in a state of when an external memory is first inserted.

Referring to FIGS. 4 and 8, the control unit 440 recognizes an external memory at operation 803 if an electric power is switched on at operation 801. At the same time, the control unit 440 can recognize an internal memory 420. The electronic device enters a waiting state for performing a function as the electric power is switched on and a booting process is completed. The internal memory 420 can store essential configuration elements of the electronic device, and the external memory 430 can store the remaining configuration elements except the essential configuration elements stored in the internal memory 420. For example, the remaining configuration elements may include a firmware storage area such as a booting area, operating system information area, user data area, firmware update information storage area, and security information area.

The control unit 440 identifies whether a request for updating firmware of the external memory 430 is detected at operation 805. The control unit 440 can detect the request for updating firmware through a firmware storage request menu displayed at a user setting step. For example, the firmware can be updated if a message "Continue to update firmware?" is displayed and a user accepts it. The request for updating firmware may be performed if information and programs stored in the external memory 430 correspond to a different electronic device.

In an embodiment of the present disclosure, information (for example, a popup window) can be provided for a user so that the user can identify and store a periodical firmware update in the firmware update information storage area of the currently connected external memory in order to use updated firmware for another electronic device.

In an embodiment of the present disclosure, the electronic device currently connected to the external memory can detect a request for storing firmware corresponding to another electronic device so that the firmware from a different electronic device can be used.

If a request for storing firmware is detected, the control unit 440 updates and stores the firmware in one of the plurality of partitions of the external memory at operation 807. The partition storing the firmware may be the firmware update information storage area in the external memory.

In an embodiment of the present disclosure, after detecting the request for storing firmware, the control unit 440 can update information of another partition based on the information of the firmware update information storage area. The control unit 440 can update information of another partition with information corresponding to binary form firmware stored in the firmware update information storage area. In an embodiment of the present disclosure, the control unit 440 can store the firmware through a program (software) supporting to store the firmware or through wireless communication.

As described above, the process of updating information of another partition corresponding to information stored in the firmware update information storage area can be performed in the existing electronic device before the external memory is inserted into another electronic device.

In another embodiment of the present disclosure, the process of updating information of another partition can be performed after the external memory is inserted into a different electronic device. In more detail, the second electronic device compares electronic device information stored respectively in the internal memory and the external memory, and it can update the firmware storage area of the external memory based on the firmware (delta file) stored in the firmware update information storage area by loading an update program into a RAM if the information regarding electronic devices in the internal memory of the second electronic device and the external memory is not identical.

In the meantime, if the request for storing firmware is not detected, the control unit 440 controls to perform a corresponding function at operation 809. For example, the control unit 440 can complete the booting by using a general booting function.

As described in FIG. 8, if a request for storing firmware is detected, the control unit 440 can store the firmware for a different electronic device or store the firmware for a different electronic device and set up a partition area of the external memory corresponding to specific information of the different electronic device.

Figure 9:
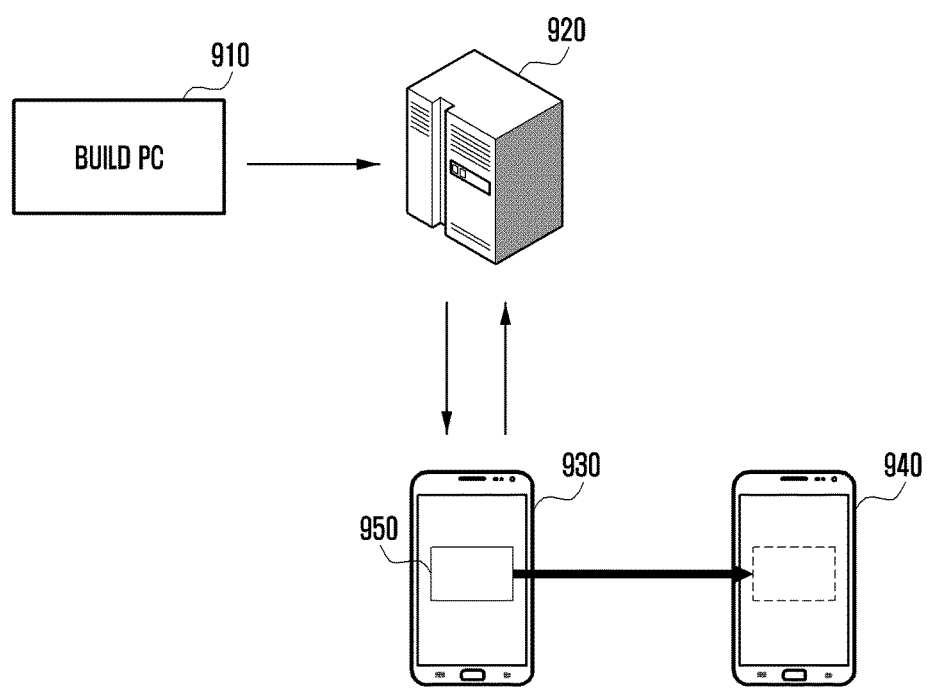
FIG. 9 is a schematic drawing illustrating an operation of sharing an external memory with a plurality of electronic devices through a server according to an embodiment of the present disclosure.

FIG. 9 is a schematic drawing illustrating an operation of sharing an external memory with a plurality of electronic devices through a server according to an embodiment of the present disclosure.

Referring to FIG. 9, the electronic device 930 can store information of a different electronic device 940 in an external memory 950 by receiving data from a server 920.

A build PC (Personal Computer) 910 generates a delta file for electronic devices having different model names and uploads the generated delta file to the server 920. The delta file may have different data between firmware versions of the different electronic devices having different model names.

The server 920 maintains the delta file uploaded by the build PC 910. The server 920 can store a plurality of delta files.

In an embodiment of the present disclosure, a first electronic device 930 may include an internal memory (not shown) and an external memory 950, and it can download firmware (delta file) of a different electronic device (for example, second electronic device 940) by connecting to the server 920 periodically or according to a user's request. For example, the first electronic device 930 can display a UX (for example, a popup window) asking whether to download firmware of a different electronic device in the external memory 950, and the user can determine to update the firmware through the UX. The first electronic device 930 can update and store the firmware of the external memory 950 corresponding to a different electronic device (for example, second electronic device 940) based on a user's selection.

If the external memory whose firmware in the firmware update information storage area is updated in the first electronic device 930 is inserted into a second electronic device 940, an update program is loaded into a RAM based on the firmware (delta file) stored in the firmware storage and the firmware storage area can be updated.

Figure 10:
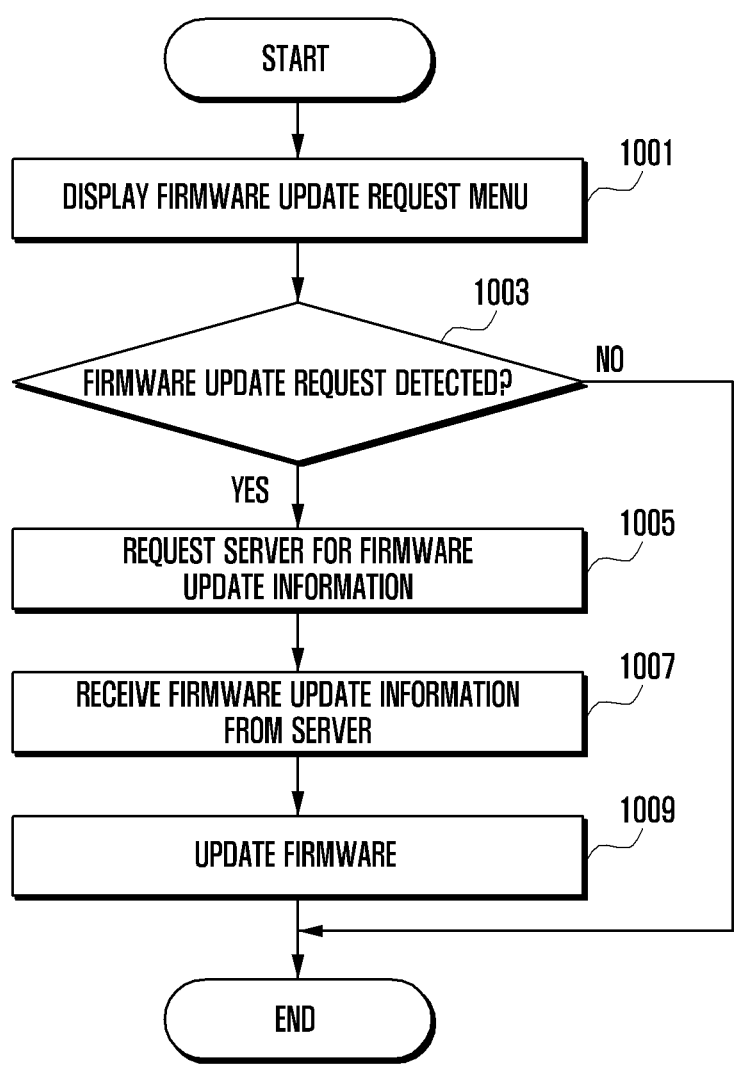
FIG. 10 is a flowchart illustrating a procedure of storing electronic device information in order to share an external memory through a server according to an embodiment of the present disclosure.

FIG. 10 is a flowchart illustrating a procedure of storing electronic device information in order to share an external memory through a server according to an embodiment of the present disclosure.

Hereafter, an embodiment will be described referring to FIG. 10 for an electronic device downloading firmware by connecting to a server. It is assumed that the electronic device is in a state of having an external memory prior to inserting the external memory into a different electronic device.

Referring to FIGS. 4 and 10, the control unit 440 displays a firmware update request menu in a display unit at operation 1001. For example, a popup window including a message "Continue to update firmware?" can be displayed in the display unit.

In an embodiment of the present disclosure, the control unit 440 can receive and display a list of different electronic devices whose firmware can be downloaded from the server 920 in the display unit. As another embodiment, so that a user can input information (for example, model name) of a different electronic device 940, the control unit 440 can provide a UX and communicate with the server 920 to receive and display a firmware list according to the user input.

The control unit 440 detects a firmware update request at operation 1003. The firmware update request can be selected to update firmware (delta information) stored in the firmware update information storage area of the external memory. The selection can be detected through an input unit of the electronic device.

The control unit 440 requests the server for firmware update information at operation 1005. The firmware update information may be firmware (delta information) of a different electronic device according to an input for updating the firmware (delta information) stored in the update information storage area of the external memory.

The control unit 440 receives the firmware update information from the server 920 at operation 1007. Accordingly, the control unit 440 can receive firmware (delta information) of a different electronic device 940 from the server 920.

Subsequently, the control unit 440 updates the firmware (delta information) stored in the firmware update information storage area with firmware corresponding to the different electronic device 940 at operation 1009. The firmware may be delta information received from the server 920 and configured only with different data between the electronic device 930 and another electronic device 940.

As described above, the control unit 440 of the electronic device 930 can update firmware (delta information) stored in the firmware update information storage area of the external memory by downloading from the server 920. The following procedure can be performed through the operations of FIGS. 7A and 7B.

Figure 11:
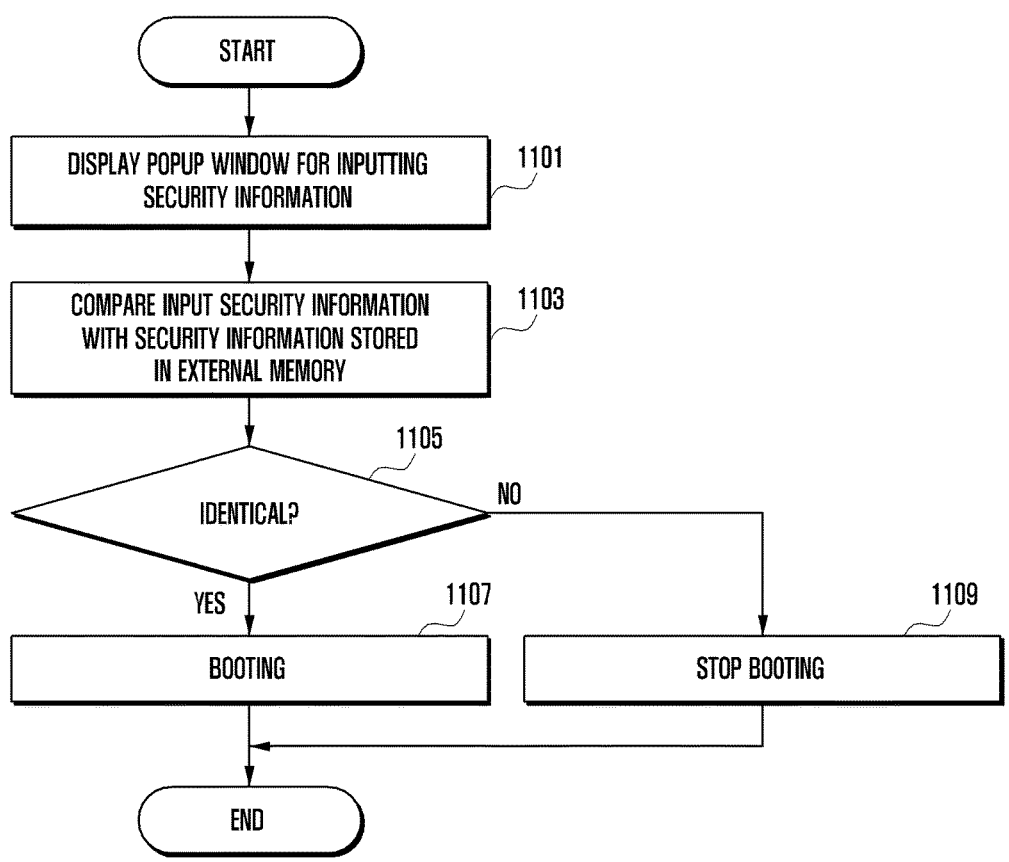
FIG. 11 is a flowchart illustrating a method of controlling a security function when sharing an external memory between electronic devices according to an embodiment of the present disclosure.
Figure 12:
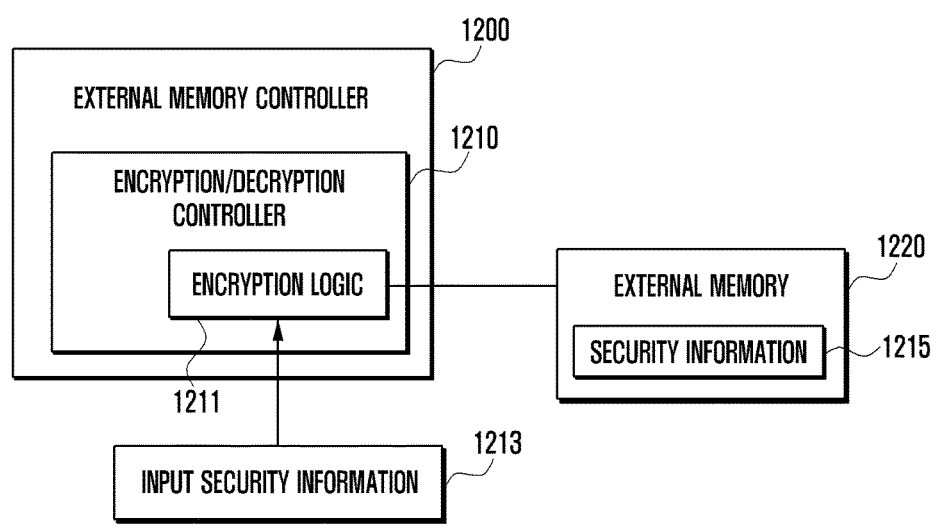
FIG. 12 is a block diagram illustrating a method of controlling a security function when sharing an external memory between electronic devices according to an embodiment of the present disclosure.

FIG. 11 is a flowchart illustrating a method of controlling a security function when sharing an external memory between electronic devices according to an embodiment of the present disclosure. FIG. 12 is a block diagram illustrating a method of controlling a security function when sharing an external memory between electronic devices according to an embodiment of the present disclosure.

A procedure of protecting information stored in the external memory 430 while booting the electronic device will be described referring to FIGS. 11 and 12.

The control unit 440 displays a popup window guiding to input security information while rebooting the electronic device at operation 1101. The security information may be a user code (for example, a password) or a fingerprint.

The control unit 440 compares input security information 1213 with security information 1215 of an external memory 1220 at operation 1103.

According to the comparison result, the control unit 440 identifies whether the input security information 1213 of the electronic device and the security information 1215 of the external memory are identical at operation 1105. If the input security information 1213 of the electronic device and the security information 1215 of the external memory are identical at operation 1105, the control unit 440 proceeds to boot the electronic device at operation 1107.

In the meantime, if the security information 1213 of the electronic device and the security information 1215 of the external memory are not identical, the control unit 440 stops the booting of the electronic device at operation 1109. For example, the control unit 440 can control to display a warning message "Not authenticated user" in a popup window.

In the above embodiment, the security information 715 stored in the external memory may be a user code or a fingerprint which can be set differently for each electronic device or variably by a user.

The control unit 440 can control a security function by using an input security information 1213. In more detail, the external memory controller 1200 may integrate an encryption/decryption controller 1210. Alternatively, although not shown in the drawing, the external memory controller 1200 may include the encryption/decryption controller 1210 at its outside (for example, in the control unit 440), and the location of the encryption/decryption controller 1210 is not limited to the above example. The encryption/decryption controller 1210 can store the security information 1215 in the external memory by encrypting through an encryption logic 1211. If a security information 1213 is input by a user, the encryption/decryption controller 1210 can decrypt the security information 1215 and compare with the input security information 1213. After comparing, the encryption/decryption controller 1210 stores the security information 1215 by encrypting again.

Various embodiments of the present disclosure can store information required for driving an electronic device by dividing into an internal memory and an external memory. If the external memory becomes defective, only the external memory can be exchanged. Therefore, the method of replacing only the external memory can save costs in comparison with a method of replacing a PCB (Printed Circuit Board) configured integrally.

Further, various embodiments of the present disclosure provide a consistent usability and conveniences for a user because an external memory storing information required for driving an electronic device can be shared between various electronic devices.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of pre-AIA 35 U.S.C. 112, sixth paragraph or 35 U.S.C. 112(f), unless the element is expressly recited using the phrase "means for."

What is claimed is:

1. An electronic device having an external memory, the electronic device comprising:
   a communication unit;
   an internal memory configured to store a first electronic device information of the electronic device and a first booting data in a first booting area, said first booting data is loaded when an electric power is supplied to the electronic device;
   an external memory configured to store:
      a second electronic device information of the electronic device,
      firmware corresponding to the electronic device in a firmware storage area, and
      updated firmware received via the communication unit in a firmware update information storage area; and
   a controller configured to:
      compare the second electronic device information stored in the external memory and the first electronic device information stored in the internal memory, and
      in response to detecting that the first electronic device information is different than the second electronic device information, change the firmware in the firmware storage area based on the updated firmware during boot-up.

2. The electronic device of claim 1, wherein the controller controls to update data stored in the firmware update information storage area with information corresponding to new firmware when a request for storing new firmware in the external memory is received.

3. The electronic device of claim 1, wherein the firmware storage area comprises:
   a second booting area storing a second booting data that is loaded for booting the electronic device; and
   an operating system information area having system information required for driving the electronic device.

4. The electronic device of claim 2, wherein the external memory is configured with a plurality of partition areas and the firmware update information storage area is allocated to a first partition area, and the controller controls to update information of a second partition area allocated as the firmware storage area based on the updated firmware in the firmware update information storage area.

5. The electronic device of claim 1, further comprising:
   a slot configured with an interface for inserting the external memory; and
   wherein the external memory is connected to or disconnected from the electronic device through the slot and can be connected to another electronic device when the external memory is disconnected from the electronic device.

6. The electronic device of claim 1, wherein the controller controls to compare the first and second electronic device information after loading the first and second booting data when an electric power is supplied to the electronic device.

7. The electronic device of claim 1, wherein the controller compares a model name of the electronic device stored in the internal memory to a model name of the electronic device stored in the external memory and boots the electronic device when the model names are identical.

8. The electronic device of claim 4, wherein the external memory further stores security information for authenticating a user; and the controller controls to display on the electronic device a popup window guiding the user to input the security information, to identify whether the security information inputted through the popup window is identical to security information stored in the external memory, to boot the electronic device when the security information inputted through the popup window is identical to the security information stored in the external memory, and to stop booting of the electronic device when the security information inputted through the popup window is not identical to the security information stored in the external memory.

9. The electronic device of claim 2, wherein the controller receives the new firmware from a server through the communication unit and stores the new firmware in the firmware update information storage area.

10. The electronic device of claim 1, wherein the external memory is a UFS (Universal Flash Storage) card configured with a plurality of partition areas and having a booting area in one of the plurality of partition areas.

11. A method for operating an electronic device having an external memory, the method comprising:
recognizing an internal memory and an external memory when an electric power is supplied;
comparing a first electronic device information of the electronic device stored in the internal memory and a second electronic device information of the electronic device stored in the external memory to generate a comparison result; and
in response to detecting that the first electronic device information is different than the second electronic device information, changing firmware stored in a firmware storage area of the external memory based on data stored in a firmware update information storage area of the external memory.

12. The method of claim 11, further comprising:
receiving a request for storing new firmware in the firmware update information storage area; and
storing information corresponding to the new firmware in the firmware update information storage area in response to the request.

13. The method of claim 11, wherein the firmware storage area further includes:
a second booting area storing booting data that is loaded for booting the electronic device;
an operating system area configured to have system information required for driving the electronic device; and
changing firmware information in the second booting area and in the operating system area based on the data stored in the firmware update information storage area.

14. The method of claim 12, wherein the external memory is configured with a plurality of partition areas, wherein the firm storage area is allocated to a first partition area and the firmware update information storage area is allocated to a second partition area, and
changing firmware in the firmware storage area further comprises updating data stored in the first partition area based on data stored in the second partition area.

15. The method of claim 11, further comprising:
disconnecting the external memory from a first slot of the electronic device; and
connecting the external memory to another electronic device through a second slot.

16. The method of claim 11, wherein comparing the first and second electronic device information of the electronic device comprises:
booting the electronic device when the first and second electronic device information of the electronic device are identical according to the comparison result.

17. The method of claim 11, further comprising: displaying on the electronic device a popup window guiding a user to input security information for authenticating the user,
identifying whether the inputted security information is identical to security information stored in the external memory, and
booting the electronic device when the inputted security information is identical to security information stored in the external memory, and stopping the booting of the electronic device when the inputted security information is not identical to security information stored in the external memory.

18. The method of claim 17, further comprising at least one of:
storing a version of firmware corresponding to a model name of the electronic device in the internal memory; and
storing a version of firmware corresponding to the model name of the electronic device received from a server in the firmware update information storage area.

19. The method of claim 11, wherein the external memory is a UFS (Universal Flash Storage) card configured with a plurality of partition areas and having a booting area in one of the plurality of partition areas.

20. A non-transitory computer-readable recording medium having recorded thereon instructions which are executed by at least one processor, causing the processor to perform a method, the method comprising:
recognizing an internal memory and an external memory when an electric power is supplied;
comparing a first electronic device information of the electronic device stored in the internal memory and a second electronic device information of the electronic device stored in the external memory to generate a comparison result;
in response to detecting that the first electronic device information is different than the second electronic device information, changing firmware stored in a firmware storage area of the external memory based on data stored in a firmware update information storage area of the external memory;
displaying on the electronic device a popup window guiding a user to input security information for authenticating the user;
identifying whether the inputted security information is identical to security information stored in the external memory; and
booting the electronic device when the inputted security information is identical to security information stored in the external memory, and stopping the booting of the electronic device when the inputted security information is not identical to security information stored in the external memory.

* * * * *